United States Statutory Invention Registration [19]

[11] Reg. Number: H704

Di Vita et al. [43] Published: Nov. 7, 1989

[54] METHOD AND APPARATUS FOR OPTICAL FIBER TRANSMISSION IN A UTILITY CONDUIT CONTAINING A HOSTILE FLUID

[75] Inventors: Sam Di Vita, W. Long Branch; Edmund E. Malecki, Rumson, both of N.J.; Loretta J. Kubricky, Ellicott City, Md.

[73] Assignee: The United of America as represented by the Secretary of the Army, Washington, D.C.

[21] Appl. No.: 166,336

[22] Filed: Mar. 10, 1988

[51] Int. Cl.[4] ..... G02B 6/44; G02B 6/10

[52] U.S. Cl. ..... 350/96.23; 350/96.30

[58] Field of Search ..... 254/134.4; 405/154; 350/96.23, 96.30

[56] References Cited

U.S. PATENT DOCUMENTS

| | | | |
|---|---|---|---|
| 4,118,211 | 10/1978 | Au Coin et al. | 65/3.1 |
| 4,239,335 | 12/1980 | Stiles | 350/96.23 |
| 4,756,510 | 7/1988 | Klamm et al. | 254/134.4 |

*Primary Examiner*—Thomas H. Tarcza

*Assistant Examiner*—Linda J. Wallace

*Attorney, Agent, or Firm*—Michael J. Zelenka; Robert A. Maikis

[57] ABSTRACT

Optical fibers are used in a utility piping system containing oil, water or gas by coating the fibers after drawing with an inorganic hermetic coating which is impervious to both moisture and whatever fluid is contained in the system. The hermetic coating permits the fibers to undergo the mechanical stresses encountered during insertion in the piping system without causing degradation of either the mechanical or optical performance of the fibers.

12 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR OPTICAL FIBER TRANSMISSION IN A UTILITY CONDUIT CONTAINING A HOSTILE FLUID

STATEMENT OF GOVERNMENT RIGHTS

The invention described herein may be manufactured, used and licensed by or for the Government for governmental purposes without the payment to us of any royalties thereon.

BACKGROUND OF THE INVENTION

1. Field of the Invention

This invention relates to fiber optics and more particularly to a method and apparatus for optical fiber transmission in a utility conduit containing a hostile fluid.

2. Description of the Prior Art

Optical fibers are a particularly valuable transmission medium in the communication arts because of their well-known broad bandpass characteristic and, of course, because of their ability to carry signal frequencies in the light wave region of the frequency spectrum. Unfortunately, however, optical fibers are expensive or inconvenient to use in many applications because of their tendency to fail or to degrade in performance when subjected to mechanical stress under hostile environmental conditions, such as exposure to high humidity, water, oil or gas, for example. When exposed to such hostile conditions, even the slightest perturbations of the optical fibers, such as microbends, for example, may significantly increase the optical transmission loss factor of the cable and also degrade its bandpass characteristic.

Because of the aforementioned characteristics of optical fibers, they are not easily introduced into conventional pipes, tubing or other conduits which contain water, gas or oil. When the optical fibers are introduced into such piping systems or other conduits, they are, of necessity, bent or subjected to other mechanical stresses which lead to their ultimate performance degradation and failure. Accordingly, when optical fibers are introduced into existing piping systems or other conduits, resort must be had to expensive non-flexible metallic shields or armored cable which limit the mechanical stresses placed on the optical fibers and also their exposure to hostile environments. Considering the vast network of piping systems which exist in the world today for the distribution of utilities, such as water, oil and gas, for example, it is apparent that a need exists for optical fiber transmission apparatus which would make use of this existing piping network and which would not require the use of the aforementioned armored cable or other shielding devices.

SUMMARY OF THE INVENTION

It is an object of this invention to provide a simple and economical method of introducing an optical fiber into a utility conduit containing a hostile fluid; the practice of which method will not degrade the optical or mechanical performance of the fiber.

It is a further object of this invention to provide a method of introducing an optical fiber into a hostile fluid-carrying utility conduit which may comprise a part of an existing utility distribution system for water, gas or oil and the like.

It is a still further object of this invention to provide optical fiber transmission apparatus which utilizes existing piping systems and other conduits carrying hostile fluids and which does not require expensive non-flexible shielding arrangements or armored cable for the optical fiber Briefly, the invention contemplates the method of introducing an optical fiber into a utility conduit containing a hostile fluid comprising the steps of sealing the optical fiber with an inorganic hermetic coating that is impervious to both moisture and the hostile fluid, and inserting the hermetically-sealed optical fiber into the conduit with a hostile fluid-tight connection.

The optical fiber transmission apparatus of the invention comprises a length of utility conduit containing a hostile fluid. The conduit has a pair of spaced-apart apertures therein. A length of optical fiber enters the conduit through one of the apertures and exits the conduit through the other of the apertures so that at least a portion of the length of the optical fiber is disposed within the conduit. The length of optical fiber is sealed with an inorganic hermetic coating that is impervious to both moisture and the hostile fluid. Finally connector means are disposed in each of the apertures for holding the optical fiber in place therein and for sealing the apertures to prevent escape of the hostile fluid from the conduit.

The term "utility conduit" as used in the specification and claims of this application shall be deemed to include not only all types of pipes and tubing, but also tanks and elongated containers. Similarly, the term "hostile fluid" as used herein shall be deemed to include water, oil and both natural and man-made gasses.

The nature of the invention and other objects and additional advantages thereof will be more readily understood by those skilled in the art after consideration of the following detailed description taken in conjunction with the accompanying drawings.

DESCRIPTION OF THE PREFERRED EMBODIMENT OF THE INVENTION

Figure 1:
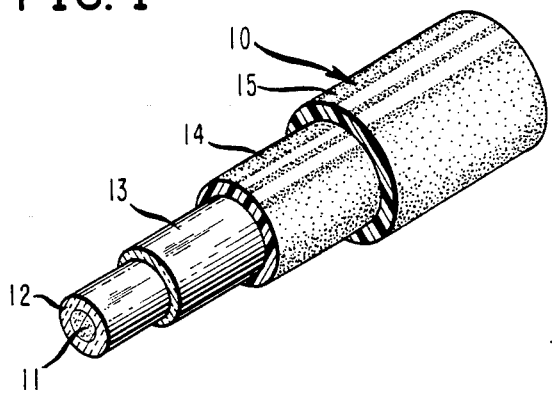
FIG. 1 is a perspective view of an optical fiber of the type employed in the present invention.

Referring now to FIG. 1 of the drawings, there is shown a single optical fiber, indicated generally as 10, of the type which may be employed in the present invention. The fiber 10 has a core 11 which may be fabricated of silicon dioxide doped with germanium, for example. The core 11 is surrounded by a fiber cladding or coating 12 of pure silicon dioxide. As is well-known in the fiber optic art, the difference in the refractive indices of the core and the cladding causes a light wave which is applied to an exposed end of the core to travel the length of the core and to be generally confined to the core.

The fiber cladding 12 is surrounded by an inorganic hermetic coating 13 which is impervious to both moisture and to hostile fluids. The hermetic coating 13 may, for example, comprise a coating of silicon carbide, silicon nitride, titanium carbide, titanium dioxide or a diamond-like carbon which is applied to the optical fiber core and cladding as soon as they are drawn from the melt during fabrication of the fiber. Details of this process of hermetically sealing and coating the optical fiber are set forth in U.S. Pat. No. 1,118,211 which was issued on Oct. 3, 1978 to Thomas R. AuCoin, Sam DiVita and Melvin J. Wade and was assigned to the assignee of the present invention. As explained in that patent, the hermetic coating greatly increases the mechanical strength of the optic fiber by eliminating or minimizing the submicron surface flaws which sometimes occur during and after the usual fiber drawing operation and which may also be caused by exposure of the fiber to atmospheric contaminants, such as moisture, for example. It has been found that the mechanical strengthening of the fiber by means of the aforementioned hermetic coating permits the fiber to be subjected to substantial mechanical stresses without causing a degradation or failure of the optical performance of the fiber.

The optical fiber 10 may be provided with an organic coating 11 which surrounds and seals the hermetic coating 13. The organic coating 14 should be fabricated of a material that does not react chemically with the hostile fluid to which the optical fiber is exposed. For example, the organic material known as Teflon may be used for such a coating. Finally, if desired, another organic coating 15 may be placed around the first organic coating 11 to add more mechanical strength to the coated fiber and, for some applications, to minimize bending of the fiber.

As an example of relative coating sizes, an optical fiber was constructed having a fiber core 11 diameter of 50 microns, a fiber cladding 12 diameter of 125 microns, a hermetic coating 13 thickness of 1 micron, an organic coating 11 having a diameter of 290 microns and an outside coating 15 of 580 microns diameter. This cable was stressed by tying a knot into it and stretching the cable between the ends of a tube filled with water, the resulting optical losses were less than 2 dB/km at 1.3 micron wave length.

Figure 2:
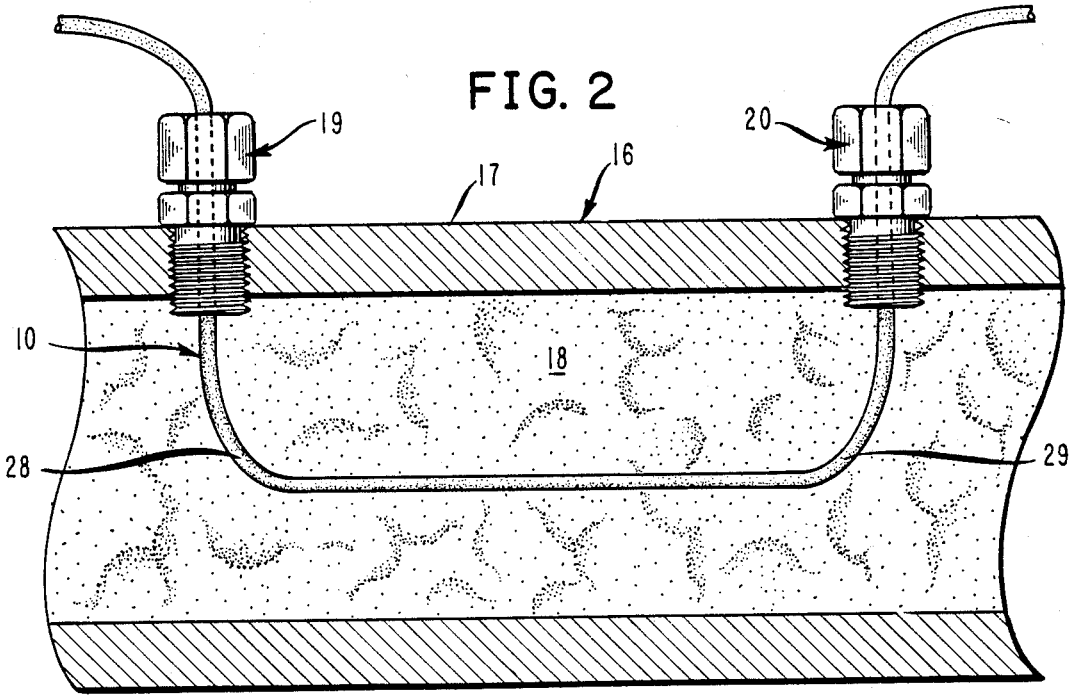
FIG. 2 is a full sectional view taken through the longitudinal axis of a cylindrical utility pipe showing an optical fiber introduced into the pipe in accordance with the teachings of the present invention.

Referring now to FIG. 2 of the drawings, there is shown a length of a cylindrical pipe, indicated generally as 16, which has a wall 17 and an interior 18 which is filled with a hostile fluid. For example, the length 16 of pipe may be a section of a utility system supplying water, gas or heating oil, for example. As illustrated, a length of fiber optic 10 having the construction shown in FIG. 1 of the drawings, enters and exits the length of pipe through a pair of spaced-apart apertures (not numbered) in the wall 17 of the pipe so that at least a portion of the length 10 of optic fiber is disposed within the interior 18 of the pipe. Connectors, indicated generally as 19 and 20, are disposed in the apertures in the wall of the pipe and serve the dual functions of holding the optical fiber length 10 in place and of sealing the apertures to prevent escape of the hostile fluid from the interior 18 of the pipe.

Figure 3:
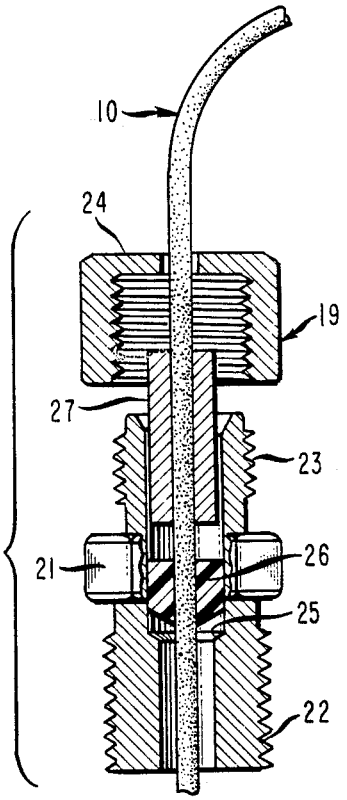
FIG. 3 is a full sectional view taken through the longitudinal axis of one of the connector means shown in FIG. 2 with the cap of the connector means unscrewed from the body of the connector means for clarity of illustration.

A full sectional view of connector 19 with the cap removed is shown in FIG. 3 of the drawings. As seen therein, the connector comprises a body portion 21 having a depending cylindrical threaded portion 22 which may be threadedly inserted into the aperture in the wall 17 of the pipe to form a hostile fluid-tight seal. The connector body 21 also has an upwardly-extending cylindrical threaded portion 23 which projects outside of the wall of the pipe and which is adapted to threadedly engage an internally-threaded cap 21. The lower body portion 22 of the connector body 21 has an interior diameter which is stepped or offset to form a downwardly-sloping, annular seal seat 25 which is adapted to receive the tapered portion of a conical seal member 26. A cylindrical follower member 27 is disposed within the upper portion 23 of the connector body 21. Both the seal member 26 and the follower member 27 have an interior bore extending along the longitudinal axis of the connector to receive the optical fiber 10. Similarly, the cap 24 is provided with an opening in the top for the fiber 10.

The seal member 26 is preferably fabricated of a resilient material which will react chemically with the hostile fluid in the interior of the pipe 16. For example, the seal member may be conveniently fabricated of Teflon. When the cap 24 of the connector is caused to threadedly engage the threaded portion 23 of the connector body 21 it forces the follower member 27 against the seal member 26 and causes the seal member 26 to be seated in the seal seat 25 which is formed in the lower portion 25 of the connector body. Since the seal member 26 is fabricated of a resilient material, the compression of the seal member will cause it to expand laterally and to bear tightly against the optical fiber 10 and against the walls of the seal seat 25 so that the hostile fluid in the interior of the pipe is prevented from escaping. For high temperature applications, it may be necessary to fabricate the seal member of a temperature resistant material such as lava, for example, which is not resilient. Consequently, for applications of this type, the tolerances of the openings in the connector must be adjusted accordingly to produce a fluid-tight connector.

Referring again to FIG. 2 of the drawings, it will be seen that the method and apparatus of the invention permit an optical fiber to be inserted into a hostile fluid-filled conduit, such as the pipe 16, without causing the optical fiber to fail because of the mechanical stress caused by bends, such as those which occur at points 28 and 29, for example. The inorganic hermetic coating on the fiber greatly increases the mechanical strength of the fiber and as previously explained prevents the degrading of the optical performance of the fiber which may be caused by exposure to the hostile fluid in the pipe. Since exposure to high humidity alone in the presence of mechanical stress can cause an optical fiber to fail, the hermetic coating should be impervious not only to the hostile fluid but also to moisture. It should also be pointed out that for some applications, the organic coatings 11 and 15 on the optical fiber not only protect the surface of the fiber from cuts and scratches but may also serve to prevent contamination of the hostile fluid in the pipe or other conduit by the material of the inorganic hermetic coating itself. For example, if the utility conduit is a length of pipe in a potable water supply system, the organic coating 14 of the optical fiber should be made of a material such as Teflon, for example, which will seal the hermetic coating and prevent it from coming into contact with the potable water.

It is believed apparent that many changes could be made in the construction and described uses of the foregoing apparatus and many seemingly different embodiments of the invention could be constructed without departing from the scope thereof, Accordingly, it is intended that all matter contained in the above description or shown in the accompanying drawings shall be interpreted as illustrative and not in a limiting sense.

What is claimed is:

1. The method of introducing an optical fiber into a utility conduit containing a hostile fluid comprising the steps of sealing the optical fiber with an inorganic hermetic coating that is impervious to both moisture and said hostile fluid, and inserting the hermetically-sealed optical fiber into the conduit with a hostile fluid-tight connection.

2. The method of claim 1 comprising the further step of coating said hermetic coating with an organic coating that does not react chemically with said hostile fluid.

3. The method of claim 1 wherein said hostile fluid is oil.

4. The method of claim 1 wherein said hostile fluid is gas.

5. The method of claim 2 wherein said conduit is a pipe in a potable water supply system, said hostile fluid is potable water, and said organic coating is a coating of Teflon.

6. The method of claim 3 wherein said conduit is a pipe in a heating oil supply system, and said hostile fluid is heating oil.

7. The method of claim 4 wherein said conduit is a pipe in a natural gas supply system, and said hostile fluid is natural gas.

8. Optical fiber transmission apparatus comprising a length of utility conduit containing a hostile fluid, said conduit having a pair of spaced-apart apertures therein;

a length of optical fiber entering said conduit through one of said apertures and exiting said conduit through the other of said apertures so that at least a portion of the length of said optical fiber is disposed within said conduit, said length of optical fiber being sealed with an inorganic hermetic coating that is impervious to both moisture and said hostile fluid; and connector means disposed in each of said apertures for holding said optical fiber in place therein and for fluid from said conduit.

9. Optical fiber transmission apparatus as claimed in claim 8 wherein said length of optical fiber has an organic coating which surrounds said inorganic hermetic coating, said organic coating being fabricated o a material which does not react chemically with said hostile fluid.

10. Optical fiber transmission apparatus as claimed in claim 8 wherein said length of utility conduit is a pipe in an oil supply system, and said hostile fluid is oil.

11. Optical fiber transmission apparatus as claimed in claim 8 wherein said length of utility conduit is a pipe in a gas supply system, and said hostile fluid is a gas.

12. Optical fiber transmission apparatus as claimed in claim 9 wherein said length of utility conduit is a pipe in a potable water supply system, said hostile fluid is potable water, and said organic coating is fabricated of Teflon.

* * * * *